No. 623,640. Patented Apr. 25, 1899.
A. E. WARWICK.
FAUCET AND ATTACHMENT THEREFOR.
(Application filed Oct. 7, 1898.)
(No Model.)
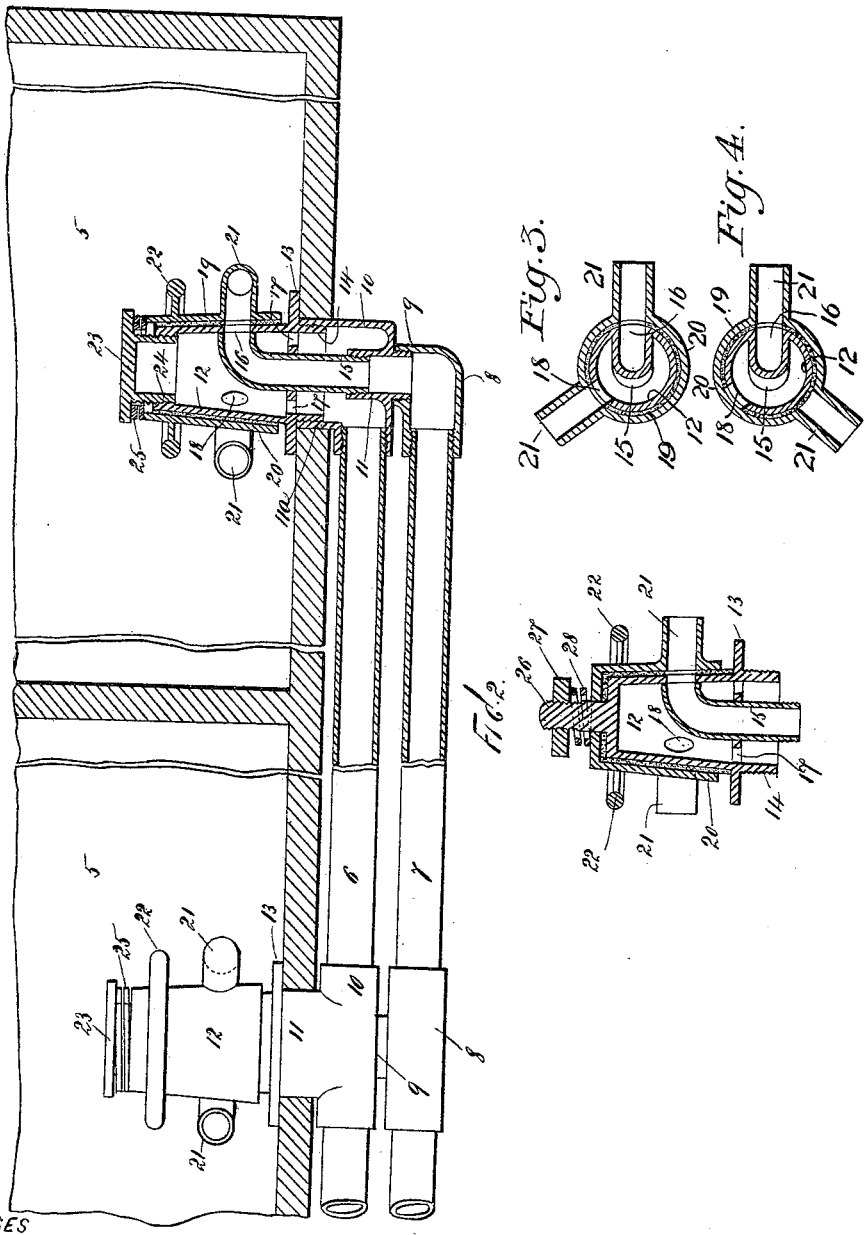
WITNESSES
John Buckler
F. W. Stewart
INVENTOR
Alfred E. Warwick
BY
Edgar Tate
ATTORNEYS
THE NORRIS PETERS CO., PHOTO-LITHO., WASHINGTON, D. C.

UNITED STATES PATENT OFFICE.

ALFRED E. WARWICK, OF NEW YORK, N. Y., ASSIGNOR TO EUGENE F. WARWICK, OF SAME PLACE.

FAUCET AND ATTACHMENT THEREFOR.

SPECIFICATION forming part of Letters Patent No. 623,640, dated April 25, 1899.

Application filed October 7, 1898. Serial No. 692,891. (No model.)

*To all whom it may concern:*

Be it known that I, ALFRED E. WARWICK, a citizen of the United States, residing at New York, in the county of New York and State of New York, have invented certain new and useful Improvements in Faucets and Attachments Therefor, of which the following is a full and complete specification, such as will enable those skilled in the art to which it appertains to make and use the same.

This invention relates to water-supply pipes and faucets for bath-tubs, laundry-tubs, sink-tubs, and other and similar devices; and the object thereof is to provide an improved faucet whereby either hot or cold water or both hot and cold water may be supplied by a single faucet, a further object being to provide an improved apparatus of the class referred to which is simple in construction and comparatively inexpensive; and with these and other objects in view the invention consists in the construction, combination, and arrangement of parts hereinafter described.

The invention is fully disclosed in the following specification, of which the accompanying drawings form a part, in which—

Figure 1 is a sectional plan view of two laundry-tubs provided with my improved water-supply apparatus, part of the construction being shown in section; Fig. 2, a sectional plan view of a modified form of the faucet which I employ; Fig. 3, a cross-section through the faucet which I employ, showing both ports or passages open for the discharge of both hot and cold water; Fig. 4, a similar view showing the valve-cap of the faucet in a different position, so as to discharge hot water only.

In the drawings forming part of this specification the separate parts of my improvement are designated by the same numerals of reference in each of the views, and in said drawings, reference being made to Fig. 1, I have shown two ordinary laundry-tubs and hot and cold water supply pipes, said tubs and pipes being provided with my improved faucet, one of which, with its connections, being shown in section.

In said drawings I have shown at 5 two ordinary laundry-tubs such as are usually employed in private laundries, or said tubs may represent bath-tubs, sink-tubs, or any similar water-receptacles, and in the practice of my invention I provide a cold-water-supply pipe 6 and a hot-water-supply pipe 7, which are located adjacent to one side of the tub or tubs, at or near the top thereof.

The hot-water-supply pipe 7 is provided with a coupling-head 8, having at one side a tubular screw-threaded extension 9, and in Fig. 1 of the drawings I have shown two of these coupling-heads. The cold-water-supply pipe 6 is provided with a corresponding coupling-head 10, having on the side thereof adjacent to the hot-water-supply pipe a tubular casing 11, which projects at right angles thereto and one end of which screws into the extension 9 of the coupling-head 8 of the hot-water-supply pipe, and the coupling-head 10 is also provided on the side adjacent to the tub or tubs with a tubular extension 11$^a$, which passes through the side of the tubs, as clearly shown in the drawings.

My improved faucet consists of a hollow conical inner portion 12, having a base-plate 13, which is provided with a screw-threaded coupling extension 14, which screws into the extension 11$^a$ of the coupling-head 10, and fixed in the center of the base-plate 13 and passing therethrough is an elbow-pipe 15, one end of which screws into the casing 11 of the coupling-head 10 and the other end of which registers with an outlet port or passage 16 in one side of the central conical portion 12 of the faucet. The base-plate 13 is also provided with ports or passages 17, which form a communication between the coupling-head 10 and the central portion 12 of the faucet, and said central portion 12 of the faucet is provided at one side with a port or passage 18.

Mounted on and inclosing the central conical portion 12 of the faucet is a packing 19, of rubber, brass, copper, or any suitable material, and mounted on and inclosing said packing and adapted to turn thereon is a valve-cap 20, which is also slightly conical in form, the outer end thereof being smaller than the inner end, and said valve-cap 20 is provided with nozzles 21, one of which is adapted to register with the elbow-pipe 15, which communicates with the hot-water-supply pipe 7, the other of which is adapted to register with the port or passage 18 in the conical central portion 12 of the faucet through which the cold water flows.

The packing 19 is not absolutely essential, but when not employed the adjacent surfaces of the central portion 12 of the faucet and the valve-cap 20 will be ground so as to make a close joint. The packing 19 is also provided with ports or passages which correspond with the tube 15 and the port or passage 18, and it will be understood that by turning the valve-cap 20 either the hot or cold water, or both together, may be discharged into the tub.

The valve-cap 20 is provided with a ring 22, by which it may be turned, and the central conical portion 12 of the faucet is provided with a cap 23 by which it is closed, said cap being provided on its inner side with a screw-threaded tubular extension 24, which screws into the end of the conical central portion 12 of the faucet, and between the perimeter of the cap 23 and the end of the valve-cap 20 is placed a strong expansive spring 25, which is intended to force the valve-cap onto its seat and to form a closed water-tight connection with the central conical portion 12 of the faucet.

In Fig. 2 I have shown a modification of the faucet in which the central conical portion 12 is closed at its outer end and provided with a screw-threaded shank 26, which passes through the outer end of the valve-cap 20 and is provided with a nut 27, between which and the end of the valve-cap 20 is placed a spring 28, and by means of this construction the said valve-cap may be held securely in place at all times and turned as hereinbefore described.

It will be seen from the drawings and the foregoing description that when the faucet is not placed at the ends of the water-pipes said pipes pass through the coupling-heads 9 and 10, as shown at the left of Fig. 1; but when the said faucet is placed at the ends of said pipes the said coupling-heads are closed at one side, as shown at the right of Fig. 1.

My improved faucet is simple in construction and operation, and by means thereof either hot or cold water may be supplied or both hot and cold water at the same time, and in operation the cold water passes into the central portion 12 of the faucet and serves to keep said central conical portion, the valve-cap, the packing, and other parts cool, while the hot water passes through the elbow-pipe 15 and is not discharged into the central portion of the faucet.

The valve 20 may be turned in either direction and, as shown in the drawings, the ports or passages 16 and 18 are not diametrically opposite, and when this form of construction is employed it will be apparent that said valve-cap may be so turned as to discharge both hot and cold water at the same time, or either hot or cold water, into the tub, as may be desired. If, however, the ports or passages 16 and 18 be arranged at diametrically opposite points, then hot and cold water will be discharged simultaneously whenever the valve-cap is turned so as to open said ports or passages.

In Fig. 3 I have shown the valve-cap in the position which it occupies when both hot and cold water are simultaneously discharged, and in Fig. 4 I have shown the valve-cap turned part way around to the right, so as to discharge hot water only, and it will be apparent that by turning it still farther the port or passage 18 may be opened and cold water discharged, while the hot-water port or passage will be closed.

My improved faucet and the means of connecting the same with the water-supply pipe are simple in construction and operation and well adapted to accomplish the purpose for which they are intended, while being also comparatively inexpensive, and it will be apparent that changes in and modifications of the construction described may be made without departing from the spirit of my invention or sacrificing its advantages.

Having fully described my invention, I claim as new and desire to secure by Letters Patent—

1. A faucet, comprising a central, hollow conical portion having a base-plate provided with ports or passages, and a screw-threaded extension on one side of said base-plate, a conical valve-cap mounted on said central conical portion, said central conical portion and valve-cap being each provided with ports or passages which are adapted to register, an elbow-pipe passing through said base-plate and registering with one of said ports or passages in the conical central portion of the faucet, means for closing the outer end of the conical central portion of the faucet and for turning said conical valve-cap, substantially as shown and described.

2. A faucet, comprising a central, hollow, conical portion having a base-plate provided with ports or passages, and a screw-threaded extension on one side of said base-plate, a conical valve-cap mounted on said central conical portion, said central conical portion and valve-cap being each provided with ports or passages which are adapted to register, an elbow-pipe passing through said base-plate and registering with one of said ports or passages in the central conical portion of the faucet, means for closing the outer end of the conical central portion of the faucet and means for turning said conical valve-cap, said faucet being also provided with a packing between the valve-cap and the conical central portion, substantially as shown and described.

3. The combination with a tub or other water-receptacle of hot and cold water supply pipes, each of which is provided with a coupling-head, the coupling-head on the water-supply pipe being provided with a tubular casing which communicates with the coupling-head on the hot-water-supply pipe, and with an extension which passes through the side of the tub, and a faucet comprising a central, hollow, conical portion having a screw-threaded extension adapted to be connected with the extension on the coupling-head of the cold-water supply, said central conical portion of the faucet being also provided with an elbow-tube which passes centrally through said base-plate and into said sleeve, and side ports or passages with one of which said elbow-tube connects, and a conical valve-cap mounted on the conical central portion of the faucet, and provided with ports or passages which are adapted to register with those formed in said conical central portion of the faucet, substantially as shown and described.

4. The combination with a tub or other water-receptacle, of hot and cold water supply pipes, each of which is provided with a coupling-head, the coupling-head on the water-supply pipe being provided with a tubular casing which communicates with the coupling-head on the hot-water-supply pipe, and with an extension which passes through the side of the tub, and a faucet comprising a central, hollow, conical portion having a screw-threaded extension adapted to be connected with the extension on the coupling-head of the cold-water supply, said conical central portion of the faucet being also provided with an elbow-tube which connects with said sleeve, and side ports or passages with one of which said elbow-tube connects, and a conical valve-cap mounted on the conical central portion of the faucet, and provided with ports or passages which are adapted to register with those formed in said conical central portion of the faucet, and means for turning said valve-cap, substantially as shown and described.

5. A faucet, comprising a central hollow portion provided with ports or passages in the sides thereof, a valve-cap mounted thereon and provided with corresponding ports or passages, means for turning said valve-cap, an elbow-tube secured in the central hollow portion and communicating with one of the ports or passages formed therein, and means for supplying water to the central hollow portion and the said elbow-tube, substantially as shown and described.

In testimony that I claim the foregoing as my invention I have signed my name, in presence of the subscribing witnesses, this 6th day of October, 1898.

ALFRED E. WARWICK.

Witnesses:
   F. A. STEWART,
   A. C. MCLOUGHLIN.